United States Patent [19]

Jackson

[11] 3,998,587
[45] Dec. 21, 1976

[54] TEXTILE TREATING DISPERSION CONCENTRATE

[75] Inventor: Harold L. Jackson, Hockessin, Del.

[73] Assignee: E. I. Du Pont de Nemours and Company, Wilmington, Del.

[22] Filed: May 28, 1975

[21] Appl. No.: 581,562

[52] U.S. Cl. .................................. 8/169; 8/94 A; 8/DIG. 5
[51] Int. Cl.² .......................................... D06P 5/04
[58] Field of Search ............... 8/169, DIG. 5, 94 A

[56] References Cited
UNITED STATES PATENTS 3,623,834   11/1971   Scuret .................................. 8/172

FOREIGN PATENTS OR APPLICATIONS 791,517    5/1973   Belgium
2,002,286  7/1971   Germany

*Primary Examiner*—Harry Wong, Jr.
*Assistant Examiner*—A. L. Clingman

[57] ABSTRACT

Stable concentrated dispersion of dye and/or textile finishing agent in liquid or solid media, suitable for dilution with a fluorocarbon to form a stable, non-aqueous textile treating bath.

10 Claims, No Drawings

TEXTILE TREATING DISPERSION CONCENTRATE

BACKGROUND OF THE INVENTION

1. Field of the Invention

The invention relates to fluorocarbon dispersions of dye and/or textile finishing agents, which dispersions are useful for modifying the color or chemical or physical properties of textile fibers.

2. Description of the Prior Art

Substantial advantages in cost, energy and environmental protection may be realized by replacing water with organic liquids in the dyeing and finishing of textile materials. Substantial savings in heat energy are realized in the use of such liquids because of their substantially lesser specific heats and heats of vaporization with respect to water. The chlorocarbons, such as tetrachloroethylene, trichloroethylene and 1,1,1-trichloroethane, have received considerable attention in such uses. More recently, fluorine-containing liquids have been considered for this use. Such liquids may have an advantage over chlorocarbons in that they generally have lower specific heats and heats of vaporization.

Belgian Patent 791,517 discloses stable, concentrated dye dispersions which may be diluted with chlorocarbons to provide stable dye baths of a concentration suitable for dyeing. German Patent 2,002,286 discloses the dyeing of textile materials by padding a solution of a dye in a liquid of the formula R-F wherein R is a radical of the formula $FCl_2C-CFCl-$, $Cl_3C-$, $Cl_2HC-$ or $F_2ClC-CFCl-$. If the dye is insoluble or inadequately soluble, it is held in dispersion by adding a dispersant selected from oxyethylated fatty alcohols and acids, alkylpolyglycol ethers, arylpolyglycol ethers, alkarylpolyglycol ethers and their sulfonates. However, since a dispersion formed in this way is unstable and the dye rather quickly settles out, it must be prepared and then used within a short time thereafter. Moreover, the tendency for the dye to settle out makes it difficult to obtain reproducibly level dyeings.

SUMMARY OF THE INVENTION

In summary, this invention resides in a stable dispersion concentrate which comprises:

a. a continuous phase consisting of an inert, organic normally liquid or solid material having a solubility parameter of no greater than 9.2, a hydrogen bonding parameter of no greater than 1.5 and solubility in 1,1,2-trichloro-1,2,2,-trifluoroethane of at least 0.99 weight % at 25° C.;

b. a normally solid particulate material which has a maximum dimension of 5 microns, is substantially insoluble in and is dispersed in the continuous phase and is selected from the group consisting of dyes and textile finishing agents; and c. a dispersant in an amount which is about 0.25-4.0 times the weight of the particulate material, the dispersant being soluble to an effective degree in the continuous phase and selected from the group consisting of $C_{12}-C_{20}$ acylates of polytitanic acids, alkaline earth salts of sulfurized alkylated phenates and alkaline earth petroleum sulfonates. The concentrate can readily be diluted with 1,1,2-trichloro-1,2,2-trifluoroethane or trichlorofluoromethane to form a stable dispersion which is useful as a textile treating bath, for exmaple, depending upon the solid particulate material, a dyebath and/or a textile finishing agent bath.

DETAILED DESCRIPTION OF THE INVENTION

This invention provides stable concentrated dispersions, hereinafter called concentrates, of dyes and/or textile finishing agents, which concentrates are characterized by a degree of stability to precipitation over long periods of time such that all portions removed from a given batch thereof provide amounts of dye and/or textile finishing agent which are consistently proportional to the weight and to the volume of the portion removed from the batch. Furthermore, there are provided stanardized concentrates which on dilution to textile treating and/or dyeing concentrations with 1,1,2-trichloro-1,2,2-trifluoroethane and/or trichlorofluoromethane are stable dispersions which are useful in effecting reproducible textile finishing treatments and/or dyeings to reproducible color depths and hues. The stable diluted dispersions are preferably applied to textiles by padding although all other continuous and batch processes of solvent dyeing or finishing are operable.

In order to achieve stability of the dispersion the particulate dye and/or finishing agent must have and retain a particle size which is such that the maximum dimension does not exceed about 5 microns. For this reason, it is important that the continuous phase not dissolve more than trace amounts of the particulate so as to avoid recrystallization of the suspended particles and formation of particles having dimensions larger than 5 microns. The liquid or solid continuous phase should, therefore, possess little ability to dissolve tha particulate material. One convenient means for describing the lack of the tendency of a material to dissolve dissimilar materials is the wellknown Hildebrand solubility parameter, as discussed, for example, in "The Solubility of Nonelectrolytes" by Joel H. Hildebrand and Robert L. Scott, 3rd edition, Reinhold Publishing Corp., New York, New York, 1950, and by H. Burrell in Journal of Paint Technology 27, 726 (1955). It is known that materials having widely different solubility parameters are immiscible with each other. The particulate of the concentrate of this invention, because it contains polar groups, has a relatively high solubility parameter (at least 10). The continuous phase of the concentrate has a solubility parameter of no greater than 9.2 and tends to dissolve so little of the particulate that recrystallization and growth of particle size do not occur to any substantial extent.

The solubility parameter of the continuous phase can be calculated from the equation $$\delta = \left[ \frac{\Delta H - RT}{V} \right]^{1/2}$$

where $\delta$ is the solubility parameter, in $(cal./cc.)^{1/2}$, $\Delta H$ is the heat of vaporization per mole, R is the gas constant, T is the absolute temperature and V is the volume per mole, all in consistent units. $\Delta H$, if not already known, is readily determined by standard methods. V, if not known, is easily calculated from the density of the compound by dividing it into the molecular weight.

Solubility parameter alone does not completely define the solid or liquid materials which have sufficiently low solubility power to be useful as a continuous phase in the concentrate. Not only must the material have a solubility parameter of no greater that 9.2, it must have a Gordy hydrogen bonding parameter of no greater than 1.5 to be useful herein. The well-known Gordy hydrogen bonding parameter is a measure of the ability of a material to hydrogen bond with a hydrogen donor, benzene being taken as the standard and having the value of 0.0. Hydrogen bonding parameters are determined experimentally by spectroscopic examination, in the range 3.6–4.35 microns, of the given solvent containing a small amount of deuterated methanol. Hydrogen bonding causes a shift of the OD bond to a lower frequency. This frequency shift of the OD bond, in wave numbers, multiplied by 0.1 is the Gordy hydrogen bonding parameter. Hydrogen bonding parameter is more particularly described by W. Gordy in Journal of Chemical Physics 7, 93 (1939); 8, 170 (1940); 9, 204 (1941). The application of this parameter is discussed by Crowley et al. in Journal of Paint Technology 38, 269 (1966).

The above criteria generally limit the continuous phase to normally liquid or solid hydrocarbon compounds, hydrocarbon compounds having a low degree of substitution by halogen and fluoroorganic compounds. Chlorocarbons such as perchloroethylene, trichloroethylene and 1,1,1-trichlororethane do not meet the above criteria and are unsatisfactory in the invention because they dissolve excessive amounts of the particulate material. Table 1 includes examples of continuous phase materials which are operable herein. Preferred materials are hydrocarbons, such as kerosene, mineral spirits and paraffin wax. Mixtures of materials meeting the above criteria are also operable.

TABLE 1

| Continuous Phase | Solubility Parameter | Hydrogen Bonding Parameter |
|---|---|---|
| $C_3F_7O(CF(CF_3)CF_2O)_nCFHCF_3$ wherein n = 1,2,3,4,5... (preferably 3–9) | 5.5–6.5 | 0 |
| $CF_2-CF-CF_3$<br>$\ \ \|\ \ \ \ \ \|$<br>$CF_2-CF-CF_3$ | 5.6 | 0 |
| $CF_3-CF-CF_2$<br>$\ \ \ \ \ \|\ \ \ \ \|$<br>$\ \ \ \ CF_2-CF-CF_3$ | 5.6 | 0 |
| $CF_3CCl_2CF_3$ | 6.3 | 0 |
| $C_3F_7CFHCF_3$ | about 6.5 | 0 |
| $CF_3CCl_2CClF_2$ | 7.0 | 0 |
| cyclic $CF_2-CF_2-O-N(CF_3)-CF_2-CF_2$ | 6.5 | 0 |
| $CF_3CFClCFClCF_3$ | 7.0 | 0 |
| cyclic $CF_2-CFCl-O-CF_2-CFCl$ | 7.0 | 0 |
| $CFCl_2CF_2Cl$ | 7.2 | 0 |
| $CF_2-CFCl$<br>$\ \|\ \ \ \ \ \|$<br>$CF_2-CFCl$ | 7.0–7.5 | 0 |

TABLE 1-continued

| Continuous Phase | Solubility Parameter | Hydrogen Bonding Parameter |
|---|---|---|
| $ClCF-CF_2$<br>$\ \ \|\ \ \ \ \ \|$<br>$CF_2-CFCl$ | 7.0–7.5 | 0 |
| $CCl_3F$ | 7.5 | 0 |
| $CCl_2FCCl_2F$ | 7.9 | 0 |
| $CCl_3CClF_2$ | 7.9 | 0 |
| n-butyl bromide | 8.7 | 1.5 |
| 1,2-dichloropropane | 9.0 | 1.5 |
| 2,2-dichloropropane | 8.2 | 1.5 |
| dipentene | 8.5 | 1.5 |
| ethylbenzene | 8.8 | 1.5 |
| isobutyl chloride | 8.1 | 1.5 |
| methylcyclohexane | 7.8 | 0 |
| mineral spirits | 7.6 | 0 |
| odorless kerosene | 7.6 | 0 |
| paraffin wax | 7.6 | 0 |

As disclosed above, the normally solid particulate material has a maximum dimension of about 5 microns, is essentially insoluble in and is dispersed in the continuous phase and is selected from the group consisting of textile finishing agents and dyes. Operable textile finishing agents include oil and water repellents, fluorescent brightening agents, ultraviolet light screening agents, bacteriostats, fungistats, flame retardants, antistatic agents and permanent press and anticrease resins. Operable dyes include any dye whose method of application and fixation are amenable to use of the concentrate, for example, disperse dyes, acid dyes, basic dyes, direct dyes, and develop dyes. In other words, the structure of the dye or textile finishing agent is not critical to the invention; substantially all known such agents are operable. The amount of particulate material in the concentrate should be at least 2%, by weight, of the continuous phase. Generally, the maximum amount of particulate material will be 50%, by weight, of the continuous phase.

Concentrates which are prepared with particles having a maximum dimension substantially greater than 5 microns, although temporarily stable, do not exhibit long term stability in that the particles settle out on standing. Various known means and equipment can be employed to reduce the particle size to the required degree; for example, a colloid mill is useful. However, it is preferred to employ the well known sand milling technique, milling the particles in the presence of the continuous phase and the dispersant. Particles operable herein are of a size that is characterized by vigorous Brownian movement. The normally solid continuous phase materials are melted before grinding or the heat generated by the grinding itself is allowed to melt the material. The more volatile liquid continuous phase materials are generally cooled during milling.

Table 2 includes examples of operable dyes and Table 3 includes examples of operable textile finishing agents.

TABLE 2

| Structure | Color |
|---|---|
| 1. | Bordeaux |
| 2. | Red |
| 3. | Blue |
| 4. | Orange |
| 5. | Yellow |
| 6. | Blue |
| 7. X = —$NO_2$ or phenyl-NH— | Blue |
| 8. | Blue |

TABLE 2-continued

| | Structure | Color |
|---|---|---|
| 9. | [anthraquinone with NH$_2$, Br, and NH—(CH$_2$)$_3$N(CH$_3$)$_3$ substituents; CH$_3$SO$_4^-$ counterion] | Blue |
| 10. | [quinoline-indanone structure with Br, OH, OH substituents] | Yellow |
| 11. | [quinoline-indanone structure with OH, OH substituents] | Yellow |
| 12. | [indolinium azo dye with CH$_3$ groups; CH$_3$SO$_4^-$ counterion] | Yellow |
| 13. | [dichloro-sulfonate phenyl azo pyrazole with 4-chlorophenyl and NH$_2$, CH$_3$ groups; NaO$_3$S] | Yellow |
| 14. | [disazo naphthalene dye with O$_2$N-phenyl, OCH$_3$, N(C$_2$H$_5$)$_2$, NHCOC$_6$H$_5$ groups] | Blue |
| 15. | [dichloro-nitrophenyl azo with N(C$_2$H$_4$CN)(C$_2$H$_4$OCC$_6$H$_5$) substituent] | Brown |
| 16. | [anthraquinone derivative with NH$_2$, NH$_2$', and NCH$_2$CH$_2$CH$_2$OCH$_3$ groups] | Blue |

TABLE 2-continued

| | Structure | Color |
|---|---|---|
| 17. | $O_2N\text{-}C_6H_2(Cl)_2\text{-}N=N\text{-}C_6H_3(CH_3)\text{-}N(C_2H_5)(C_2H_4CN)$ | Brown |
| 18. | $O_2N\text{-}C_6H_3(Cl)\text{-}N=N\text{-}C_6H_3(NHCOC_6H_5)\text{-}N(C_2H_4O_2CCH_3)_2$ | Brown |
| and | $O_2N\text{-}C_6H_3(Cl)\text{-}N=N\text{-}C_6H_2(OCH_3)_2\text{-}N=N\text{-}C_6H_3(NHO_2SCH_3)\text{-}N(C_2H_4O_2CCH_3)_2$ | |
| 19. | 1-amino-4-hydroxy-2-phenoxyanthraquinone | Cerise |
| 20. | 1-amino-4-hydroxy-2-(2-hydroxypropoxy)ethoxy anthraquinone (OCH$_2$CH$_2$CHOHCH$_3$) | Cerise |
| 21. | 1,4-diamino-2,3-dichloroanthraquinone | Violet |
| 22. | $O_2N\text{-}C_6H_4\text{-}N=N\text{-}C_6H_4\text{-}N(CH_2CH_2CN)(CH_3)$ | Orange |
| 23. | 1,4-bis(phenylamino)anthraquinone | Violet |
| 24. | $O_2N\text{-}C_6H_3(Cl)\text{-}N=N\text{-}C_6H_3(NHOC\text{-}C_6H_{11})\text{-}N(CH_2CH_2O_2CCH_3)_2$ | Red |

TABLE 2-continued

| | Structure | Color |
|---|---|---|
| 25. | [structure] | Yellow |
| 26. | [structure] | Blue |
| 27. | [structure] | Red |
| 28. | Phthalocyanine | Green |
| 29. | Polychloro copper phthalocyanine | Blue |
| 30. | [structure] | Yellow |
| 31. | [structure] | Orange |
| 32. | [structure] | Blue |

TABLE 2-continued

| | Structure | Color |
|---|---|---|
| 33. | | Red |
| 34. | | Brown |
| 35. | | Brown |
| 36. | | Blue |
| 37. | | Orange |
| 38. | | Bordeaux |
| 39. | | Blue |

TABLE 2-continued

| | Structure | Color |
|---|---|---|
| 40. | [structure: 4-chloro-2-trifluoromethylphenyl azo linked to 1-amino-4-hydroxy-6-sulfonato(Na) naphthalene] | Red |

Table 3

| | | |
|---|---|---|
| 1. | [3,5-dibromo-2-hydroxy-N-(4-bromophenyl)benzamide] | Bacteriostat |
| 2. | [2-hydroxy-4-dodecyloxybenzophenone; C₁₂H₂₅O–phenyl(OH)–CO–phenyl] | Ultraviolet light screening agent |
| 3. | [2-(2H-benzotriazol-2-yl)phenol] | Ultraviolet light screening agent |
| 4. | [bis-benzimidazolyl ethylene: benzimidazole–C–CH=CH–C–benzimidazole] | Fluorescent brightening agent |
| 5. | [substituted chroman-2-one with CH₃, CH₃NH, CH₃ substituents] | Fluorescent brightening agent |
| 6. | $(BrCH_2)_3CCH_2OP(=O)(N{-}S{-}O\text{ ring})_2$ | Flameproofing agent |
| 7. | [N-(trichloromethylthio)phthalimide: phthalimide N–SCCl₃] | Fungicide |
| 8. | [bis-benzoxazolyl ethylene: benzoxazole–C–CH=CH–C–benzoxazole] | Fluorescent brightening agent |

The dispersants which are operable herein are characterized by solubility to an effective degree in the continuous phase. The preferred dispersants are the titanium acylates wherein the acyl group contains about twelve to about twenty carbon atoms. The acylates are polytitanic acid derivatives which are prepared according to processes which are well known and described in the prior art, for example, U.S. Pat. No.

2,621,195. The compounds are conveniently prepared from a titanium ortho ester, such as a tetraalkyl titanate, for example, tetraisopropyl titanate. The ester is reacted with about two moles of water and one mole of an aliphatic carboxylic acid $RCO_2H$, per atom of titanium, and a mixed acylate of polytitanic acid is formed; it contains repeat units of the formula

In order that the polytitanic acid acylates have adequate solubility in the continuous phase, the aliphatic carboxylic acid should contain at least about 12 carbon atoms. It serves no useful purpose to exceed about 20 carbon atoms. Based on these limitations R in the above formulas has 11–19 carbon atoms.

Other dispersants useful herein are the alkaline earth salts of sulfurized alkylated phenates. These can be conveniently prepared by well known processes which are included in the prior art, for example, U.S. Pat. No. 2,680,097. In brief, an alkylphenol, such as cetyl- or amylphenol, is reacted with an alkaline earth salt, such as calcium oxide, in ethylene glycol, and thereafter with sulfur, at an elevated temperature; the desired product contains about 0.6–12 wt. % calcium and about 1–4 wt. % sulfur.

The third type of dispersant, the alkaline earth petroleum sulfonates, can be prepared by sulfonating a petroleum distillate and thereafter neutralizing the sulfonated material with an alkaline earth hydroxide, such as calcium hydroxide. Such materials, and processes for their preparation, are well known in the prior art, for example, R. Sperling, Ind. and Eng. Chem., Vol. 40, 890–897 (1948) and A. Schilling, "Motor Oils and Engine Lubrication," Scientific Publications, Ltd., page 244, 1968.

Many alkaline earth salts of sulfurized alkylated phenates and alkaline earth petroleum sulfonates are commercially available either as a solution or as a dispersion in neutral oil. The oil does not adversely affect their usefulness in this invention.

As already indicated, the concentrate can be prepared by known grinding methods wherein the dye or textile finishing agent is ground to a maximum dimension of 5 microns in the presence of the continuous phase and a dispersant in an amount which is about 0.25–4.0 times the weight of the dye or finishing agent.

The amount of dispersant required depends in part on the ionic content of the dye or agent; the higher the ionic content, for example, in the form of salts, the greater the amount of dispersant that is required. Sand milling, which is conventional in the milling of dyes, was employed in the examples. The procedure consisted in charging the dye and/or finishing agent, continuous phase, dispersant and banding sand to a stainless steel beaker. Grinding was achieved, with external cooling or heating as required, by means of a turning shaft having mounted thereon two disks of diameter slightly less than the inside diameter of the beaker. Typical turning speed was 1,200 rpm. From time to time a sample of the mixture was removed, diluted with appropriate liquid and examined under an optical microscope. When the maximum dimension of the particles was not more than about 5 microns and vigorous Brownian movement was observed, grinding was discontinued. Generally, from one to about four hours were required. The relative amounts of continuous phase and banding sand are not critical. Generally, about 4–5 parts by weight of continuous phase per part of dye and/or finishing agent are employed. This amount of continuous phase is enough to wet the approximately five parts of banding sand normally employed. The concentrate was then passed through a filter which allowed the concentrate to pass but not the sand. The filtered concentrates of the invention, as well as dispersions of dyebath or textile finishing agent bath concentrations prepared by dilution of the concentrates with 1,1,2-trichloro-1,2,2-trifluoroethane and/or trichlorofluoromethane are, in general, stable for many weeks.

EXAMPLES

Tables 4 (dyes) and 5 (textile finishing agents) include concentrates which are of the invention and which were prepared from a variety of dyes, textile finishing agents, dispersants and continuous phases according to the above-described method. The dyes are identified by the numbers assigned in Table 2; the textile finishing agents are identified by the number assigned in Table 3. The stability data represent the minimum periods of stability since examination of each sample was discontinued after the time period shown. In Examples 2–7 and 9, seven parts of dye and four parts of dispersant, by weight, were employed. In all the examples, parts are by weight unless otherwise noted. Although the examples demonstrate the use of 1,1,2-trichloro-1,2,2-trifluoroethane as the continuous phase and/or dilutant, trichlorofluoromethane serves equally well.

TABLE 4

| Example No. | Dye No. | Dispersant | Continuous Phase | Stability (Weeks) |
|---|---|---|---|---|
| 1 | 22 | Polytitanyl Stearate | Odorless kerosene | 9 |
| 2 | 22 | Calcium Petroleum Sulfonate (3.0 wt. % Ca) | Mineral spirits | 3 |
| 3 | 22 | Calcium Petroleum Sulfonate (11.8 wt. % Ca) | Mineral spirits | 3 |
| 4 | 22 | Calcium Petroleum Sulfonate (1.9 wt.% Ca) | Mineral spirits | 3 |
| 5 | 22 | Magnesium Petroleum Sulfonate (7.3 wt. % Mg) | Mineral spirits | 3 |
| 6 | 22 | Calcium Mixed Alkyl Sulfurized Phenate (4.5 wt. % Ca; 3.1 wt. % S) | Mineral spirits | 3 |
| 7 | 22 | Same (9.3 wt. % Ca; 3.7 wt. % S) | Mineral spirits | 3 |
| 8 | 22 | Polytitanyl Stearate | Mineral spirits (b.p. 180–190° C.) | 3 |
| 9 | 2 | As in Example 7 | Mineral spirits | 3 |
| 10 | 16 | Polytitanyl Stearate | 1,1,1,2-tetrachloro- | greater than |

TABLE 4-continued

| Example No. | Dye No. | Dispersant | Continuous Phase | Stability (Weeks) |
|---|---|---|---|---|
| | | | 2,2-difluoroethane | 9 (solid at 25° C.) |

TABLE 5

| Example No. | Finishing Agent No. | Dispersant | Continuous Phase | Stability Weeks |
|---|---|---|---|---|
| 11 | 3 | Polytitanyl Stearate | 1,1,2-trichloro-1,2,2-trifluoro-ethane | 9 |
| 12 | 7 | Polytitanyl Stearate | 1,1,2-trichloro-1,2,2-trifluoro-ethane | 9 |

EXAMPLE 13

This example demonstrates the preparation of a dye concentrate employing a polymeric titanium acylate dispersant and the use thereof in the beam dyeing of polyethylene terephthalate fabric. A mixture of 7 grams of dye No. 22, 3.5 grams of a titanium acylate (polytitanyl stearate) dispersant of the formula

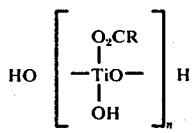

wherein R is $C_{17}H_{35}$ and n is about 5 was milled for four hours with 50 grams of banding sand and sufficient 1,1,2-trichloro-1,2,2-trifluoroethane to wet the mixture. The sand was separated by filtration to isolate a stable dispersion of particles having a maximum dimension of no greater than 5 microns. Five grams of the stable dispersion were diluted with 1,400 ml. of 1,1,2-trichloro-1,2,2-trifluoroethane to yield a stable dispersion of textile treatment strength. The dispersion was added to a commonly known laboratory size package dyer, for example, of the type described in American Dyestuff Reporter 43,392 (1954). A length of polyester texturized double-knit fabric weighting 50 grams was wrapped around a perforated steel tube which was installed in the dyer to simulate beam dyeing. The dye dispersion was circulated through the fabric for ten minutes and heat was applied to distill of the 1,1,2-trichloro-1,2,2-trifluoroethane. As the chlorofluorocarbon was removed, $F(CF(CF_3)CF_2O)$averge $6.5CFHCF_3$ was added at a rate such as to maintain the volume of the dispersion approximately constant. When substantially all of the chlorofluorocarbon was removed, the temperature reached 130°–133° C., which temperature was maintained for 30 minutes. The dyebath had only a slight trace of orange color, indicating almost quantitative exhaustion of the dye onto the fabric. The fabric was rinsed with 1,2,2-trichloro-1,2,2-trifluoroethane and dried; it was evenly dyed and exhibited a soft hand.

EXAMPLE 14

This example demonstrates the preparation of a concentrate containing the calcium salt of a sulfurized alkylated phenate and dilution of the concentrate to produce a pad liquor. A mixture of 7 grams of dye No. 40, 4 grams of the calcium salt of a sulfurized alkylated phenate (containing about 9.3 wt. % calcium and 3.7 wt. % sulfur) and 50 grams of banding sand was milled for three hours in odorless kerosene to yield, after filtration, a stable dispersion weighing 48.5 grams. A part of the dispersion (3.6 parts by volume) was diluted with 50 parts by volume of 1,1,2-trichloro-1,2,2-trifluoroethane to yield a pad liquor. The pad liquor was padded onto nylon fabric. The padding was observed to by uniform and suitable for fixation by a variety of methods, including known prior art methods, such as oven fixing.

EXAMPLE 15

This example demonstrates the application of a fluorescent brightening agent to polyester fabric. A mixture of 1 part of the fluorescent brightening agent of the formula

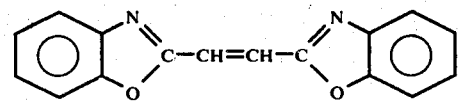

and 1 part of the dispersant of Example 13 was milled in odorless kerosene with 280 parts of banding sand. After filtering off the sand, the stable dispersion was diluted with 88,000 parts of 1,1,2-trichloro-1,2,2-trifluoroethane to provide a treatment strength dispersion which was employed to treat 1,000 parts of textured polyester double-knit fabric by a procedure substantially as described in Example 13 except that the dye bath was held 30 minutes at 120° C. Thereafter, the fabric was rinsed with 1,1,2-trichloro-1,2,2-trifluoroethane and, following this, with acetone to ensure removal of unfixed brightening agent. Under ultraviolet light irradiation, the fabric was seen to fluoresce strongly and evenly.

EXAMPLE 16

This example includes a demonstration of a dyeing process using a concentrate of a dye dispersed in 1,1,2-trichloro-1, -trifluoroethane containing an alkaline earth salt of a petroleum sufonate as dispersant. A mixture of 7 parts of dye No. 22 and 4 parts of a calcium petroleum sulfonate (containing 11.8 wt. % calcium) was milled with 50 parts of banding sand in odorless kerosene to provide 46.7 parts of a stable concentrate. A portion (2.3 parts) of the concentrate was diluted with 2,198 parts of 1,1,2-trichloro-1,2,2-trifluoroethane and the mixture was transferred to a package dyer substantially as described in Example 13. A sample (50 parts) of texturized polyester double-knit fabric was dyed by a procedure substantially as described in Example 13 except that fixation was carried out at 135° C.; it was found to be dyed uniformly and strongly. The fluorocarbon was found to be substantially colorless, indicating complete exhaust onto the fabric. Similarly good results were obtained using a calcium petroleum sulfonate dispersant of higher molecular weight (wherein the amount of calcium was 1.9% by wt.)

EXAMPLE 17

This example demonstrates the preparation of a dispersion concentrate containing a flame retardant. A concentrate was prepared from 3.5 parts of the flame retardant of the formula

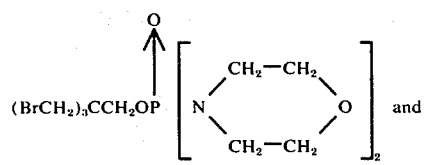

2.0 parts of the calcium salt of a petroleum sulfonate dispersant (containing 11.8 wt. % calcium) by milling in 1,1,2-trichloro-1,2,2-trifluoroethane with 40 parts of banding sand. After milling for 2 hours, additional dispersant (1.5 parts) was added and milling was continued for 30 minutes. After filtering to remove sand, 69.8 parts of stable dispersion were recovered. The mixture was diluted with about 47 parts of 1,1,2-trichloro-1,2,2-trifluoroethane. Three parts of polyester, spun yarn woven fabric were treated therewith according to a procedure substantially as described in Example 13. Fixation was effected by holding the temperature of the bath at 140°–141° C. for 1 hour. Thereafter, the fabric was scoured successively with trichlorotrifouoroethane, trichloroethylene and again with trichlorotrifluoroethane. The dried fabric contained 1.8% by weight bromine (this corresponds to 86.8% by weight exhaustion) and was found to be flame resistant.

I claim:

1. Stable concentrate dispersion comprising
   a. a continuous phase consisting of an inert, organic normally liquid or solid material having a solubility parameter of no greater than 9.2, a hydrogen bonding parameter of no greater than 1.5 and solubility in 1,1,2-trichloro-1,2,2-trifluoroethane of at least 0.99 weight % at 25° C.;
   b. a normally solid particulate material which has a maximum dimension of 5 microns, is substantially insoluble in and is dispersed in the continuous phase and is selected from the group consisting of dyes and textile finishing agents; and
   c. a dispersant in an amount which is about 0.25–4.0 times the weight of the particulate material, the dispersant being soluble to an effective degree in the continuous phase and selected from the group consisting of $C_{12}$–$C_{20}$ of polytitanic acids, alkaline earth salts of sulfurized alkylated phenates and alkaline earth petroleum sulfonates.

2. The dispersion of claim 1 wherein the normally liquid or solid continuous phase is selected from the group consisting of kerosene, mineral spirits and paraffin wax.

3. The dispersion of claim 1 wherein the amount of particulate material is 2–50%, by weight, of the continuous phase.

4. The dispersion of claim 3 wherein the particulate material having a maximum dimension of 5 microns has been prepared by a process employing a sand milling technique.

5. The dispersion of claim 1 wherein the particulate material is a dye.

6. The dispersion of claim 5 wherein the dye is a disperse dye.

7. The dispersion of claim 1 wherein the particulate material is a textile finishing agent.

8. The dispersion of claim 1 wherein the dispersant is a titanium acylate containing repeat units of the formula

wherein R is an aliphatic group of 11–19 carbon atoms.

9. The dispersion of claim 1 wherein the dispersant is an alkaline earth salt of a sulfurized alkylated phenate.

10. The dispersion of claim 1 wherein the dispersant is an alkaline earth salt of a petroleum sulfonate.

* * * * *

UNITED STATES PATENT OFFICE
CERTIFICATE OF CORRECTION

PATENT NO. : 3,998,587
DATED : December 21, 1976
INVENTOR(S) : H. L. Jackson

It is certified that error appears in the above-identified patent and that said Letters Patent are hereby corrected as shown below:

Column 22, line 14, claim 1, after $C_{12} - C_{20}$ insert -- acylates --.

Signed and Sealed this

Thirty-first Day of May 1977

[SEAL]

Attest:

RUTH C. MASON
Attesting Officer

C. MARSHALL DANN
Commissioner of Patents and Trademarks